United States Patent [19]

Welborn et al.

[11] Patent Number: 4,848,117
[45] Date of Patent: Jul. 18, 1989

[54] SHOPPING CART LIST HOLDER

[76] Inventors: Woodrow W. Welborn, Rte. 12, Box 400; Vernon W. Harlow, 2534 Audubon Dr., both of Laurel, Miss. 39440

[21] Appl. No.: 47,384

[22] Filed: May 8, 1987

[51] Int. Cl.⁴ .............................. G09F 3/00
[52] U.S. Cl. ........................ 40/308; 40/658; 211/45; 248/229; 248/451; 281/45
[58] Field of Search .............. 40/308, 11 R; 211/45, 211/50, 89; 248/441.1, 447.2, 451, 452, 453, 316.1, 316.4, 229; 281/42, 45; 224/274, 277

[56] References Cited

U.S. PATENT DOCUMENTS

| | | | |
|---|---|---|---|
| 2,206,775 | 7/1940 | Hoofer | 40/11 R |
| 2,888,761 | 4/1958 | Miller | 40/308 |
| 3,251,543 | 5/1966 | Bush et al. | 40/308 |
| 3,408,032 | 10/1968 | Francis | 248/451 X |
| 3,539,204 | 11/1970 | Keller | 281/45 |
| 3,881,267 | 5/1975 | Hicks | 40/308 |
| 4,021,953 | 5/1977 | Couch | 40/308 |
| 4,034,539 | 7/1977 | Economy | 40/308 |
| 4,123,029 | 10/1978 | Gillotti | 248/453 |
| 4,156,318 | 5/1979 | Economy | 40/308 |
| 4,423,888 | 1/1984 | Addison | 40/308 |
| 4,443,961 | 4/1984 | Gilroy | 40/308 |
| 4,496,058 | 1/1985 | Harris et al. | 40/308 |
| 4,739,960 | 4/1988 | Adler | 248/453 |

Primary Examiner—Carlton R. Croyle
Assistant Examiner—Eugene L. Szczecina, r.
Attorney, Agent, or Firm—Edwin E. Greigg

[57] ABSTRACT

An attachment for a shopping cart for securing a grocery list, shopping coupons, etc. The attachment includes a base member upon which spaced bars are secured by spring loaded holders. The base member is secured to the cross-handle of the shopping cart by use of a clamp having the general inner shape of the handle. The bars are lifted in order to place the grocery list or coupons under the bars.

2 Claims, 1 Drawing Sheet

SHOPPING CART LIST HOLDER

BACKGROUND OF THE INVENTION

This invention is directed to a shopping cart list holder and more particularly to a list holder having spring loaded bars in which the springs are sufficiently strong to prevent a young child from moving the bars.

Heretofore various types of shopping cart list holders have been patented such as those disclosed in the following U.S. Pat. Nos.: 2,888,761; 3,539,204; 3,881,267; 4,034,539; 4,156,318; 4,423,888; and 4,496,058. Such devices are believed to be child-proofed; that is, a child is believed not to be able to open the list holders such that the list will drop or fall to the floor or else to injure himself on the grasping means provided thereon to hold the list.

In particular, the prior art shows the following features taken individually. The Miller U.S. Pat. No. 2,888,761 discloses a springclip flanked by a store directory, all mounted on a cart handle permanently. The Keller U.S. Pat. No. 3,539,204 discloses an integral mounting means, clip and shelf supported on a cart handle. The Hicks U.S. Pat. No. 3,881,267 discloses a detachable holder secured by a wing-nut in an erect position; list retention means and a pencil are provided. The Economy U.S. Pat. Nos. 4,034,539 and 4,156,318 are directed to a list holder which is clipped to the child seat bracket and which, when that bracket is folded rearwardly, slips down into a retracted storage position, each patent defining a different position for storage. The Addison U.S. Pat. No. 4,423,888 disclosed a clip-board which is permanently secured and rotatable by 270° from a storage position into a use position supported on the cart frame; note dual clips for list and coupons. The Harris et al U.S. Pat. No. 4,496,058 uses a dual surface tray mounted via C-clamps to the handle of a cart; this patent includes a good description of prior art devices.

OBJECT AND SUMMARY OF THE INVENTION

It is an object of this invention to provide a list holder which can be positively secured to the handle of a shopping cart and which is provided with spring loaded bars such that a child cannot open the bars.

Another object is to provide a simple list holder which can be used for holding different items such as a grocery list and savings coupons without danger that a child will release the holder.

The invention will be better understood and further objects and advantages thereof will become more apparent from the ensuing detailed description of a preferred embodiment taken in conjunction with the drawing.

DETAILED DESCRIPTION

Figure 1:
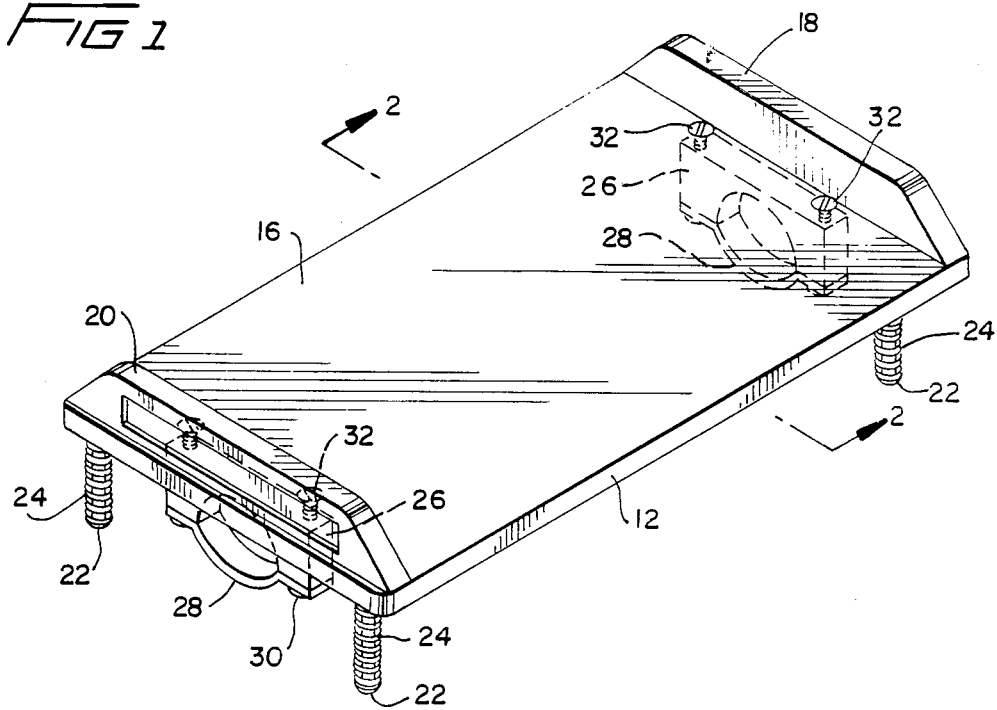
FIG. 1 is a perspective view of the device.
Figure 2:
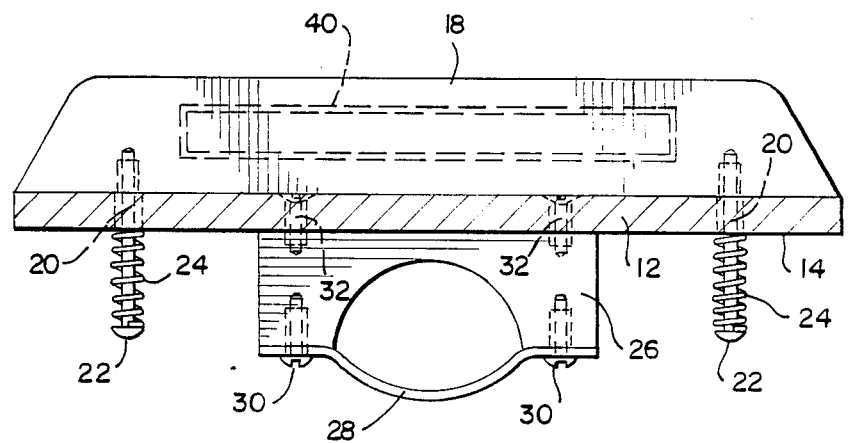
FIG. 2 is a cross-sectional view across the middle of the device looking toward one of the ends.

Now referring to the drawing, wherein like reference characters refer to like parts, there is shown in the drawings a shopping cart list-coupon holder 10. The holder includes a base 12 having a width, length, bottom surface 14, top surface 16, leading edge, trailing edge and oppositely disposed lateral edges. As shown, a pair of spaced elongated bars 18, 20 are secured onto the upper surface near opposite lateral edges by use of a spaced bolts 20, which passes through the base and threads into threaded holes in the bottom of the elongated bars and a spring 24, which surrounds the bolt between the bottom surface of the base and the bolt head 22. Washers may be placed on opposite ends of the spring to prevent marring the bottom surface of the base and for supporting the spring against the bolt head. The spring must be a hard spring which exerts considerable force on the bars to prevent a child from lifting the bars. Bolts may pass through the bars and the base and extend below the base for securing the springs in place or studs may be used which are threaded into the bottom of the bars and then secured in place by suitable nuts below the base and the springs.

A pair of clamps are secured to the bottom surface of the base for holding the base onto a shopping cart handle. The clamps are formed by rectangular pieces of suitable material having arcuate or semi-circular matching pieces 26, 28 that are secured together at their ends by suitable bolts or studs 30. One piece 26 of the clamp is held onto the bottom surface of the base by any suitable means such as bolts 32 that pass through the base and thread into the clamp portion 26. The ends of the clamp are formed such that they extend outwardly sufficiently that bolts with wing nuts may be used to secure the lower portion 28 to the upper portion 26.

The base may be made of any suitable material which has a smooth upper surface such that one could write on a piece of paper resting upon the base. The base may be provided with one or two clamps by which the list holder may be held to the shopping cart handle.

The bars are shown near opposite edges of the holder. It would be obvious that the bars be placed end-to-end across the length near one edge for holding items side-by-side from the top of the holder. Each of the bars may have a rectangular recessed area 40 by which the bar may be gripped for lifting the bars.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. An attachment for shopping cart comprising: a base member having a width, a length, a top surface, a bottom surface, a leading edge, a trailing edge and right and left lateral edges; clamp means secured to said bottom surface for attaching said base member to a handle of a shopping cart; elongated bar means including two bars, each of said bars being secured along opposite end edges of said base member and arranged to abut said top surface of said base member in a first position; spring-loaded means for securing said bar means to said top surface of said base member, said spring-loaded means being secured to opposite ends of each of said two bars for exerting a spring-load on said bar means and said base member, and in a second position said elongated bar means is raised completely above said top surface of said base member; and each of said bar means includes a substantially rectangular recessed area adapted to ease grasping the bar means to retract same.

2. An attachment for a shopping cart comprising: a base member having a width, a length, a top surface, a bottom surface, a leading edge, a trailing edge and right and left lateral edges; two spaced clamps secured to said bottom surface for attaching said base member to a handle of a shopping cart; elongated bar means including two bars, each of said bars being secured along opposite end edges of said base member and arranged to abut said top surface of said base member in a first position; spring-loaded means for securing said bar means to said top surface of said base member, said spring-loaded means being secured to opposite ends of each of said two bars and opposite each end of said spaced clamps for exerting a spring-load on said bar means and said base member, and in a second position said elongated bar means is raised completely above said top surface of said base member; and each of said two spaced clamps comprises U-shaped saddle members adapted to straddle the cart handle and against which an arcuate closure piece is affixed by a securing means.

* * * * *